United States Patent
Hur et al.

(10) Patent No.: US 11,216,092 B2
(45) Date of Patent: Jan. 4, 2022

(54) DISPLAY DEVICE AND REMOTE CONTROL DEVICE, DISPLAY SYSTEM COMPRISING SAME AND METHOD FOR CALCULATING DISTANCE THEREOF

(71) Applicant: SAMSUNG ELECTRONICS CO., LTD., Suwon-si (KR)

(72) Inventors: Jae-myung Hur, Seongnam-si (KR); Dong-wook Kim, Suwon-si (KR); Seung-il Yoon, Suwon-si (KR); Kwan-young Kim, Suwon-si (KR); Hyun-kyu Yun, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 3 days.

(21) Appl. No.: 16/621,358

(22) PCT Filed: Jun. 1, 2018

(86) PCT No.: PCT/KR2018/006304
§ 371 (c)(1),
(2) Date: Dec. 11, 2019

(87) PCT Pub. No.: WO2019/022364
PCT Pub. Date: Jan. 31, 2019

(65) Prior Publication Data
US 2021/0141467 A1    May 13, 2021

(30) Foreign Application Priority Data
Jul. 25, 2017  (KR) .................. 10-2017-0094175

(51) Int. Cl.
*G06F 3/038*   (2013.01)
*G01S 11/14*   (2006.01)
(Continued)

(52) U.S. Cl.
CPC ............ *G06F 3/0383* (2013.01); *G01S 11/14* (2013.01); *G06F 3/04845* (2013.01); *G06F 3/16* (2013.01);
(Continued)

(58) Field of Classification Search
CPC ...... G06F 3/0383; G06F 3/04845; G06F 3/16; G06F 2203/0384; H04R 1/028;
(Continued)

(56) References Cited

U.S. PATENT DOCUMENTS 9,170,325 B2 * 10/2015 Zhang .................... G01S 11/14
9,316,717 B2 *  4/2016 Gicklhorn ............. G01S 3/8083
(Continued)

FOREIGN PATENT DOCUMENTS

JP     2007-306444      11/2007
JP     2008-066931       3/2008
(Continued)

OTHER PUBLICATIONS

International Search Report with English translation, dated Sep. 20, 2018, 4 pages.
(Continued)

*Primary Examiner* — Vinh T Lam
(74) *Attorney, Agent, or Firm* — Nixon Vanderhye, P.C.

(57) ABSTRACT

A display device is disclosed. The display device comprises: a signal reception unit; a communication unit for communicating with a remote control device; a storage unit for storing sound data; a speaker; and a processor for playing a sound and outputting the same through the speaker when a specific remote control signal transmitted from the remote control device is received through the signal reception unit, wherein the processor receives, from the remote control device and through the communication unit, recording data in which the point in time, at which the sound is received by
(Continued)

the remote control device, is recorded, thereby enabling the distance between the display device and the remote control device to be calculated on the basis of the recording data.

15 Claims, 12 Drawing Sheets

(51) Int. Cl.
    *G06F 3/0484*     (2013.01)
    *G06F 3/16*     (2006.01)
    *H04R 1/02*     (2006.01)
    *H04R 1/08*     (2006.01)
    *H04N 21/422*     (2011.01)

(52) U.S. Cl.
    CPC .............. *H04R 1/028* (2013.01); *H04R 1/08* (2013.01); *G06F 2203/0384* (2013.01); *H04N 21/42221* (2013.01); *H04N 21/42222* (2013.01); *H04R 2499/15* (2013.01)

(58) Field of Classification Search
    CPC ....... H04R 1/08; H04R 2499/15; G01S 11/14; H04N 21/42222; H04N 21/42221
    See application file for complete search history.

(56) References Cited

U.S. PATENT DOCUMENTS

| | | | |
|---|---|---|---|
| 10,349,171 B2 | 7/2019 | Yoon et al. | |
| 2006/0239121 A1* | 10/2006 | Kong | G01S 11/16 367/128 |
| 2008/0309757 A1* | 12/2008 | Wan | H04N 5/4403 348/61 |
| 2009/0190790 A1* | 7/2009 | Yamagami | H05K 1/148 381/394 |
| 2009/0319276 A1* | 12/2009 | Chang | G10L 15/26 704/275 |
| 2012/0124525 A1 | 5/2012 | Kang | |
| 2016/0291141 A1* | 10/2016 | Han | G01S 3/8083 |
| 2017/0048459 A1 | 2/2017 | Masuda et al. | |
| 2017/0167832 A1* | 6/2017 | Hong | H04N 7/181 |
| 2017/0242651 A1* | 8/2017 | Lang | G06F 3/165 |
| 2017/0366909 A1* | 12/2017 | Mickelsen | H04R 3/06 |
| 2018/0238994 A1* | 8/2018 | Da Silva Freitas | G01S 11/14 |
| 2018/0307462 A1* | 10/2018 | Choi | G01S 5/18 |
| 2018/0364972 A1* | 12/2018 | Sim | G06F 3/165 |
| 2018/0376268 A1* | 12/2018 | Kerdranvat | H04S 7/30 |

FOREIGN PATENT DOCUMENTS

| | | |
|---|---|---|
| KR | 10-2000-0001967 | 1/2000 |
| KR | 10-0531341 | 11/2005 |
| KR | 10-2010-0027318 | 3/2010 |
| KR | 10-1040181 | 6/2011 |
| KR | 10-2011-0094367 | 8/2011 |
| KR | 10-1521363 | 5/2015 |
| KR | 10-2016-0144919 | 12/2016 |
| WO | 2012/027594 | 3/2012 |

OTHER PUBLICATIONS

Written Opinion of the ISA with English translation, dated Sep. 20, 2018, 14 pages.
Office Action dated Feb. 18, 2021 in Korean Patent Application No. 10-2017-0094175 and English-language translation.
Decision of Rejection dated Aug. 25, 2021 in Korean Patent Application No. 10-2017-0094175 and English-language translation.
Notice of Decision of Rejection dated Oct. 15, 2021 in counterpart Korean Patent Application No. 10-2017-0094175 and English-language translation.

* cited by examiner

FIG. 12

| No. | DISTANCE (1210) | RESULT VALUE (1220) | SIGNAL SENDING TIME POINT (1230) | SOUND OUTPUT TIME POINT (1240) | DELAY TIME (1250) |
|---|---|---|---|---|---|
| 1 | 1 | 0.985941 | OK | OK | 0.52035 |
| 2 | | 1.063142 | OK | OK | 0.489311 |
| 3 | | 0.663647 | OK | before 1ms | 0.494111 |
| 4 | | 0.646315 | after 1ms | before 1ms | 0.507849 |
| 5 | | 1.511427 | before 1ms | OK | 0.500617 |
| 1 | 2 | 1.771657 | before 1ms | OK | 0.497289 |
| 2 | | 1.639627 | OK | before 1ms | 0.505865 |
| 3 | | 2.220054 | before 1ms | OK | 0.528158 |
| 4 | | 1.666884 | OK | before 1ms | 0.49266 |
| 5 | | 1.892582 | OK | before 1ms | 0.506121 |
| 1 | 3 | 2.922479 | after 1ms | OK | 0.521779 |
| 2 | | 3.452708 | before 1ms | OK | 0.510345 |
| 3 | | 3.445919 | OK | after 1ms | 0.513865 |
| 4 | | 3.420039 | after 1ms | OK | 0.506441 |
| 5 | | 3.254429 | before 1ms | OK | 0.523678 |
| 1 | 4 | 4.392138 | before 1ms | OK | 0.524019 |
| 2 | | 4.3419 | before 1ms | OK | 0.532105 |
| 3 | | 4.380354 | OK | after 1ms | 0.494367 |
| 4 | | 3.907062 | OK | OK | 0.512884 |
| 5 | | 4.741619 | after 1ms | after 1ms | 0.505929 |
| 1 | 5 | 5.303218 | OK | before 1ms | 0.511902 |
| 2 | | 4.684692 | after 2ms | OK | 0.521971 |
| 3 | | 5.465302 | before 1ms | after 1ms | 0.529801 |
| 4 | | 5.465302 | after 1ms | OK | 0.505737 |
| 5 | | 5.299165 | before 1ms | OK | 0.512414 |

DISPLAY DEVICE AND REMOTE CONTROL DEVICE, DISPLAY SYSTEM COMPRISING SAME AND METHOD FOR CALCULATING DISTANCE THEREOF

This application is the U.S. national phase of International Application No. PCT/KR2018/006304 filed 1 Jun. 2018, which designated the U.S. and claims priority to KR Patent Application No. 10-2017-0094175 filed 25 Jul. 2017, the entire contents of each of which are hereby incorporated by reference.

TECHNICAL FIELD

The disclosure relates to a display device and a remote control device that may output sound, a display system including the same, and a method for calculating a distance thereof.

BACKGROUND ART

Recently, due to the development of electronic technology, various types of electronic devices have been developed and distributed. In particular, various types of display devices are used in general homes.

The user generally controls an operation of the display device by using a remote control device. In this case, if a distance between the remote control device and the display device may be calculated, a distance between the user and the display device, that is, a viewing distance may be inferred. If the viewing distance may be measured, it may provide a variety of services based on the measured viewing distance. Therefore, the need to measure the viewing distance has emerged.

As a conventional method of measuring a distance, there is a method of measuring a distance using optical. For example, the electronic device outputs a laser to a point to measure the distance, and measures the distance by using a reflected signal.

Alternatively, there is also a method of measuring a distance using an ultrasonic wave. For example, the electronic device measures the distance by outputting an ultrasonic signal and then receiving the reflected signal.

However, in order to apply such a method to the display device, various components need to be added. Therefore, there is a problem that the size and price of the display device are increased.

SUMMARY

The disclosure provides a display device and a remote control device that may measure a distance using sound, a display system including the same, and a method for calculating a distance thereof.

According to an embodiment of the disclosure, a display device includes a signal receiver; a communicator; a storage storing sound data; a speaker; and a processor configured to, based on a specific remote control signal sent from a remote control device through the communicator and received by the signal receiver, reproduce the sound data and output sound through the speaker, wherein the processor is configured to receive recorded data of the sound recorded by the remote control device from the remote control device through the communicator, and calculate a distance between the display device and the remote control device based on the recorded data.

The processor may be configured to calculate the distance by calculating the total time required by detecting a first time point at which the remote control signal is sent and a second time point at which the sound is received at the remote control device, respectively, from the recorded data, calculating a delay time required to output the sound after receiving the remote control signal, and multiplying a subtraction result value obtained by subtracting the delay time from the total time required by a sound speed.

The display device may further include a sensor hub configured to be connected to the signal receiver through a first pin provided in the signal receiver and connected to the speaker through a second pin provided in the speaker, wherein the processor may be configured to calculate a time difference between a time point at which the specific remote control signal is transmitted to the sensor hub through the first hub and a time point at which the sound is transmitted to the speaker through the second pin from the sensor hub as the delay time.

The storage may be configured to store characteristic information of an audio signal generated based on the sending of the specific remote control signal and characteristic information of the sound, respectively, and the processor may be configured to analyze the recorded data and determine a detection time point of a section as the first time point and the second time point, respectively, based on detection of the section that matches each characteristic information stored in the storage.

The display device may further include a display, wherein the processor may be configured to enlarge a size of a user interface (UI) based on the distance which is farther than a predetermined distance, and reduce the size of the UI based on the distance which is closer than the predetermined distance, in a state in which the UI is displayed on the display.

The processor may be configured to determine a volume size of the display device based on a calculated distance when the distance is calculated.

The signal receiver may be configured to receive a remote control signal of the form of an infra-red ray (IR) signal or a radio frequency (RF) signal from the remote control device, and the communicator may be configured to communicate with the remote control device in at least one communication method of Bluetooth, Wi-Fi, Wi-Fi Direct, or Zigbee.

According to another embodiment of the disclosure, a display system includes a display device; and a remote control device configured to control the display device, wherein the remote control device is configured to activate a microphone to start recording based on an occurrence of an event for distance measurement, and transmit a specific remote control signal to the display device, the display device is configured to reproduce and output pre-stored sound data based on a reception of the specific remote control signal, the remote control device is configured to transmit recorded data to the display device based on an elapse of a predetermined time after starting the recording, and the display device is configured to calculate a distance between the display device and the remote control device based on the recorded data.

The display device may be configured to calculate the distance by calculating the total time required by detecting a first time point at which the remote control signal is sent and a second time point at which sound is received at the remote control device, respectively, from the recorded data, calculating a delay time required to output the sound after receiving the remote control signal, and multiplying a subtraction result value obtained by subtracting the delay time from the total time required by a sound speed.

The display device may include a signal receiver configured to receive the remote control signal; a communicator configured to receive the recorded data from the remote control device; a storage configured to store the sound data; a speaker configured to output sound; a sensor hub configured to be connected to the signal receiver through a first pin provided in the signal receiver and connected to the speaker through a second pin provided in the speaker; and a processor configured to calculate the distance by calculating the total time required by detecting a first time point at which the remote control signal is sent and a second time point at which the sound is received at the remote control device, respectively, from the recorded data, calculating a result value obtained by subtracting a time point at which the sound is transmitted to the speaker through the second pin from the sensor hub from a time point at which the specific remote control signal is transmitted to the sensor hub through the first pin as a delay time, and multiplying a subtraction result value obtained by subtracting the delay time from the total time required by a sound speed.

According to still another embodiment of the disclosure, a method for calculating a distance of a display device includes outputting specific sound based on a specific remote control signal sent from a remote control device; receiving recorded data of the sound recorded by the remote control device from the remote control device; and calculating a distance between the display device and the remote control device based on the recorded data.

The calculating of the distance may include calculating the total time required by detecting a first time point at which the remote control signal is sent and a second time point at which the sound is received at the remote control device; respectively, from the recorded data; calculating a delay time required to output the sound after receiving the remote control signal; and calculating the distance by multiplying a subtraction result value obtained by subtracting the delay time from the total time required by a sound speed.

The calculating of the total time required may include detecting a first section matching characteristic information of an audio signal generated based on the sending of the remote control signal and a second section matching characteristic information of the sound, from an audio waveform of the recorded data; and detecting a start time point of the first section as the first time point and detecting a start time point of the second section as the second time point.

The method may further include enlarging a size of a user interface (UI) based on the distance which is farther than a predetermined distance, and reducing the size of the UI based on the distance which is closer than the predetermined distance, in a state in which the UI is displayed on the display.

The method may further include determining a volume size of the display device based on a calculated distance when the distance is calculated.

The specific remote control signal may be in the form of an infra-red ray (IR) signal or a radio frequency (RF) signal, and the display device may communicate with the remote control device in at least one communication method of Bluetooth, Wi-Fi, Wi-Fi Direct, or Zigbee.

According to still another embodiment of the disclosure, a remote control device includes a signal outputter, a microphone, a communicator, a storage, and a processor configured to activate the microphone based on an input of a distance measurement command for measuring a distance between a display device and the remote control device to record sound received through the microphone in the storage, and control the signal outputter to send a specific remote control signal, wherein the processor is configured to transmit recorded data recorded in the storage to the display device through the communicator based on an elapse of a predetermined time after starting the recording.

According to diverse embodiments of the disclosure described above, the distance between the display device and the remote control device may be calculated. The display device may also provide various services based on the calculated distance. Accordingly, convenience of the user is improved.

BRIEF DESCRIPTION OF THE DRAWINGS

FIG. 12 is a diagram illustrating experimental result values according to an embodiment of the disclosure.

DETAILED DESCRIPTION OF EXAMPLE EMBODIMENTS

Figure 1:
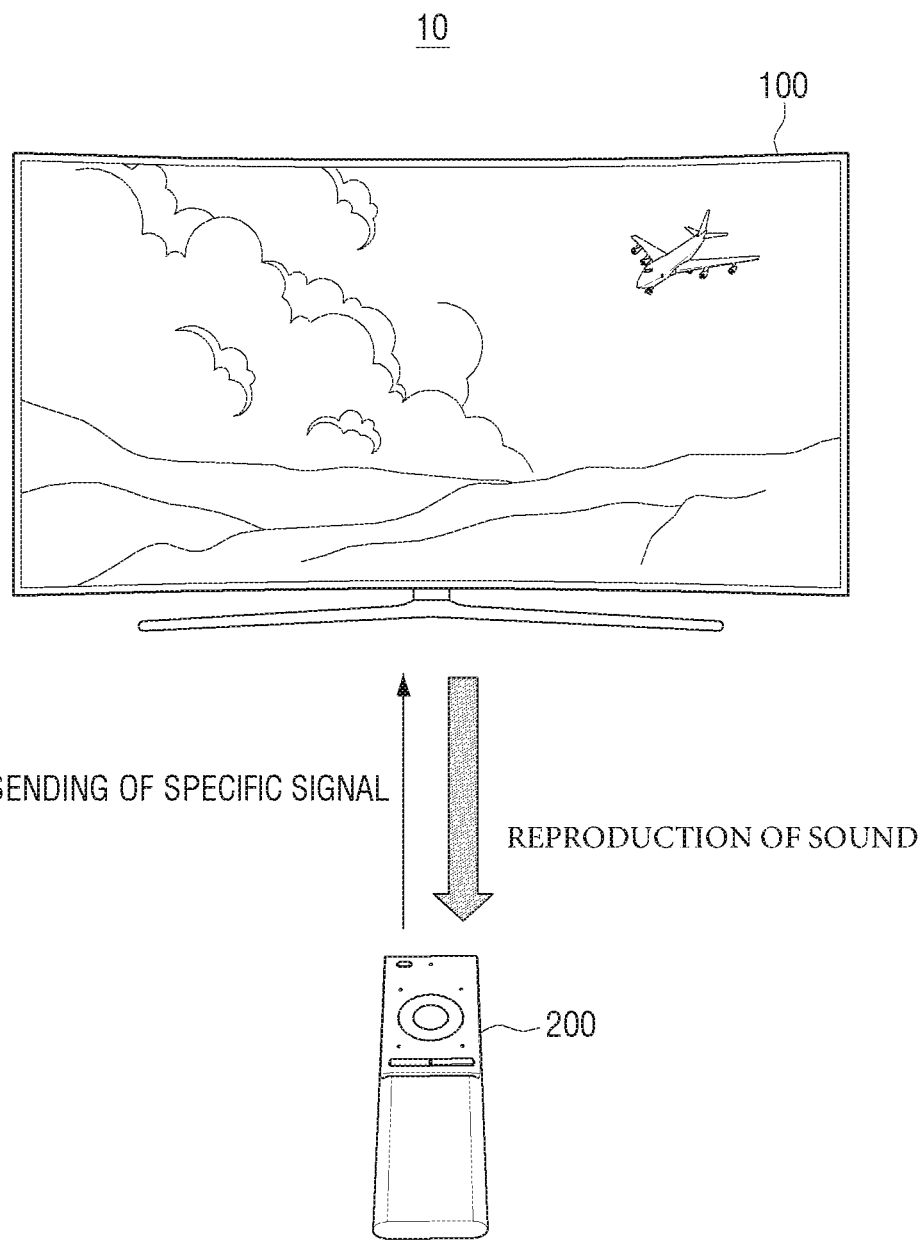
FIG. 1 is a schematic view illustrating a configuration of a display system according to an embodiment of the disclosure.

Before describing the disclosure in detail, a method of describing the specification and drawings will be described.

First, the terms used in the specification and claims have chosen generic terms in consideration of the function of the disclosure. However, these terms may vary depending on the intentions of the artisan skilled in the art, legal or technical interpretation, and emergence of new technologies. In addition, some terms are arbitrarily chosen by the applicant. These terms may be construed as meaning as defined herein, and may be interpreted based on the general contents of the specification and common technical knowledge in the related art, unless otherwise defined.

In addition, like reference numerals or symbols in the drawings attached to the specification denote parts or components that perform substantially the same functions. For convenience of explanation and understanding, different embodiments will be described using the same reference numerals or symbols. That is, although all of the components having the same reference numerals are shown in the drawings, the drawings do not imply one embodiment.

In addition, in the specification and claims, the terms including ordinal numbers such as "first" and "second" may be used to distinguish between the components. These ordinal numbers are used to distinguish the same or similar components from each other, and the meaning of the terms should not be construed as being limited by the use of these ordinal numbers. As an example, the components coupled to the ordinal number should not be interpreted as a use order, a layout order, or the like being limited by the number. The respective ordinal numbers are interchangeably used, if necessary.

In the specification, the singular expression includes the plural expression unless the context clearly indicates otherwise. It should be understood that terms "include" or "constituted" used in the application specify the presence of features, numerals, steps, operations, components, parts mentioned in the specification, or combinations thereof, but do not preclude the presence or addition of one or more other features, numerals, steps, operations, components, parts, or combinations thereof.

A term "part" or the like in the embodiment of the disclosure is a term for referring to the component performing at least one function or operation, and such a component may be implemented in hardware or software or a combination of hardware and software. In addition, a plurality of "parts" or the like may be integrated into at least one module or chip and may be implemented in at least one processor (not illustrated), except for a case in which they need to be each implemented in individual specific hardware.

In addition, in an embodiment of the disclosure, when a part is connected to another part, this includes not only a direct connection but also an indirect connection through another medium. In addition, unless explicitly described otherwise, "comprising" any components will be understood to imply the inclusion of other components but not the exclusion of any other components.

Hereinafter, the disclosure will be described in detail with reference to the accompanying drawings.

FIG. 1 is a schematic view illustrating a configuration of a display system according to an embodiment of the disclosure.

Referring to FIG. 1, a display system 10 according to an embodiment of the disclosure may include a display device 100 and a remote control device 200.

The display device 100 may be implemented as a content output device, for example, a TV. However, the display device 100 is not limited thereto, and any device capable of outputting content through a display and having a speaker 130 may be applied without being limited thereto.

The remote control device 200 refers to a device for controlling the display device 100 at a long distance. However, the remote control device 200 is not limited thereto, and any device capable of controlling the display device 100 with a signal output through a signal outputter 210 may be applied without being limited thereto. For example, the remote control device 200 may be implemented as a mobile phone or tablet PC installed with a remote control application.

When an event for distance measurement occurs, the remote control device 200 outputs a specific remote control signal. Examples of the event may include an event in which a user selects a specific key provided in the remote control device 200, an event in which the user grabs or lifts the remote control device 200, an event in which the user inputs a voice command for distance measurement through a microphone 220 provided in the remote control device 200, an event of turning on the display device, an event in which the remote control device 200 is turned on in a turned off state, an event in which a predetermined time period arrives, an event in which a request is received from the display device, and the like.

When the specific remote control signal is received from the remote control device 200, the display device 100 outputs specific sound.

The remote control device 200 may receive sound reproduced by the display device 100 through the microphone 220.

According to an embodiment, the remote control device 200 may record the received sound and transmit recorded data to the display device 100. The display device 100 may analyze the recorded data to check a time point at which the remote control signal is sent and a time point at which the sound is received. For convenience of description, in the specification, the time point at which the remote control signal is sent is referred to as a first time point, and the time point at which the sound is received is referred to as a second time point. The display device 100 may compare the first time point and the second time point, calculate a time taken while the sound is transmitted, and calculate a distance using the same.

According to another embodiment, when the sound is received, the remote control device 200 may provide a feedback to the display device 100. If a communication session (e.g., Bluetooth) is connected between the remote control device 200 and the display device 100, the feedback may be transmitted through the communication session, but is not necessarily limited thereto. For example, the feedback may be transmitted in the form of an RF signal, an IR signal, or the like. When the display device 100 receives the feedback, the display device 100 may compare the time point at which the remote control signal is received and the time point at which the feedback is received, calculate a time taken while the sound is transmitted, and calculate a distance using the same.

When the distance is calculated, the display device 100 may provide various services using the distance. These services will be described in detail later.

Figure 2:
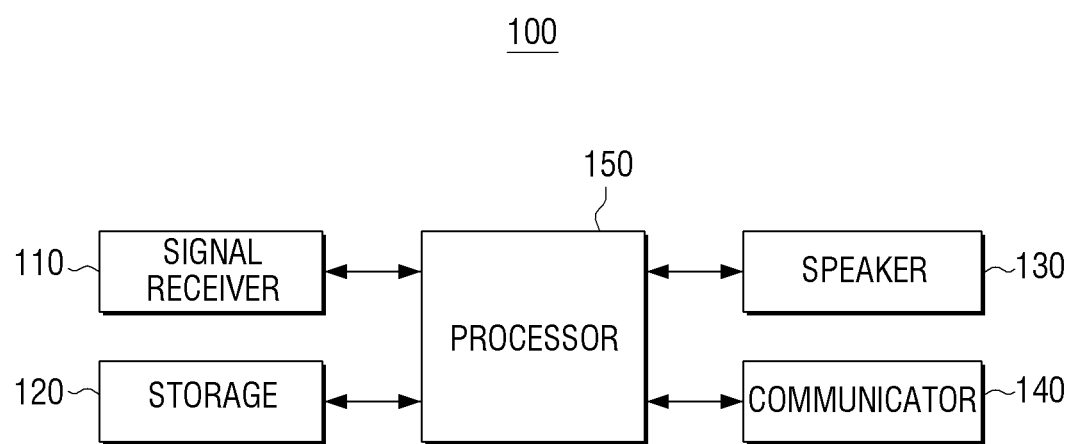
FIG. 2 is a block diagram illustrating a configuration of a display device according to an embodiment of the disclosure.

FIG. 2 is a block diagram illustrating a configuration of a display device according to an embodiment of the disclosure.

Referring to FIG. 2, the display device 100 includes a signal receiver 110, a storage 120, a speaker 130, a communicator 140, and a processor 150.

The signal receiver 110 is a component for receiving the remote control signal sent from the remote control device 200. The remote control signal may include various signals such as a turn on signal, a turn off signal, a volume up signal, a volume down signal, a channel up signal, a channel down signal, a channel number selection signal, and the like. Among them, if a specific remote control signal set separately for distance measurement is received, the display device 100 may perform a distance measurement task. The remote control signal may be in the form of an infrared-ray (IR) signal or a radio frequency (RF) signal.

The storage 120 may store sound data output through the speaker 130. Here, a frequency of the stored sound may be set in an inaudible frequency range, for example, 16 KHz or more. In the case of a sound set in the inaudible frequency region, the stored sound may be distinguished from ordinary noise. However, the frequency of the stored sound is not limited thereto.

In addition, the storage 120 may store characteristic information of an audio signal generated when the specific remote control signal is sent and characteristic information of a sound. In addition, the storage 120 may also store various programs or data necessary for an operation of the display device 100.

The speaker 130 is a component for outputting various sounds.

The communicator 140 is a component for performing communication with the remote control device 200. The communicator 140 may be implemented as various communication modules such as Bluetooth (BT), wireless fidelity (WI-FI), Wi-Fi direct, Zigbee, serial interface, universal serial bus (USB), near field communication (NFC), Z-wave, etc.

The processor 150 controls an overall operation of the display device 100.

When the specific remote control signal sent from the remote control device 200 is received through the signal receiver 110, the processor 150 starts the distance measurement task as described above. Specifically, the processor 150 reproduces the sound data stored in the storage 120 and outputs a specific sound through the speaker 130.

After the output sound is recorded in the remote control device 200, the remote control device 200 may transmit the sound to the display device 100 through the communicator 140.

When the recorded data transmitted from the remote control device 200 is received through the communicator 140, the processor 150 calculates a distance between the display device 100 and the remote control device 200 based on the recorded data.

Specifically, the processor 150 detects a first time point at which the specific remote control signal is sent and a second time point at which the stored sound is received by the remote control device 200, respectively, from the received recorded data.

As an example, the processor 150 calculates a time between the first time point and the second time point, that is, the total time required. The processor 150 may measure the distance to the remote control device 200 by multiplying the calculated required time by a sound speed.

As still another example, for more precise measurement, the processor 150 may calculate a delay time delayed in the display device 100 and then subtract the delay time from the total time required. The processor 150 may also calculate the distance by multiplying the subtraction result by the sound speed.

Figure 3:
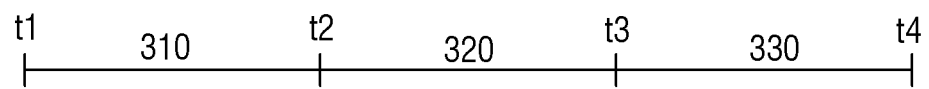
FIG. 3 is a diagram illustrating from a time point at which a remote control signal is sent to a time point at which a remote control device records sound.

FIG. 3 is a diagram illustrating from a time point at which a remote control signal is sent to a time point at which a remote control device records sound.

In FIG. 3, a time point t1 indicates a time point at which the remote control signal is sent, a time point t2 indicates a time point when the display device 100 receives the remote control signal, a time point t3 indicates a time point at which the sound is output, and a time point t4 indicates a time point at which the remote control device 200 receives the sound. A first section 310 indicates the time for which the remote control signal is transmitted from the remote control device to the display device, and a second section 320 indicates a delay time required for reproducing and outputting sound from the display device, and a third section 330 indicates the time at which sound is transmitted to the remote control device.

If the remote control signal is an IR signal, the first section 310 may be ignored because the IR signal has a speed of light. Therefore, if the second section 320 is subtracted from the total time required, the time required for the sound output through the speaker 130 to reach the remote control device 200, that is, the third section 330 may be checked. The processor 150 may calculate the distance between the display device 100 and the remote control device 200 by multiplying the required time, which is a result value of the subtraction by a sound speed.

Figure 4:
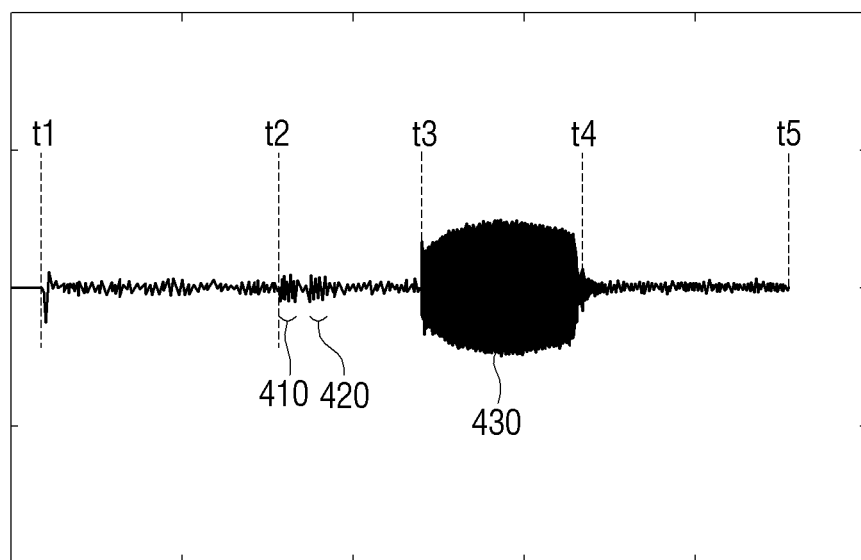
FIG. 4 is a diagram illustrating an example of recorded data transmitted by the remote control device.

FIG. 4 is a diagram illustrating an example of recorded data transmitted by the remote control device.

Referring to FIG. 4, when the event occurs, the remote control device 200 starts recording by activating the microphone 220 before sending the remote control signal. t1 of FIG. 4 indicates a time point at which the recording is started. Thereafter, a remote control signal for distance measurement is output. The user may not recognize, but when the remote control device sends the remote control signal, a fine sound is generated. Such a sound 410 may also be recorded. t2 of FIG. 4 denotes a time point at which the above-mentioned sound is recorded. The remote control signal may be sent many times and a reflection sound reflected by surrounding objects may occur. Accordingly, an additional sound 420 also be recorded. Thereafter, if the display device 100 outputs a sound, the sound 430 is also recorded. t3 of FIG. 4 indicates a time point at which the sound is received and t4 indicates a time point at which the sound reception is completed. The remote control device 200 ends the recording when a predetermined time elapses after the start of recording. t5 denotes a time point at which the recording ends.

When recorded data of a waveform as illustrated in FIG. 4 is received, the processor 150 may extract a waveform 410 generated when the remote control signal is sent and a waveform 430 corresponding to the sound reproduced by the display device 100 in the recording data based on various characteristic information stored in the storage 120. The processor 150 may analyze the waveform of the recorded data using at least one algorithm of normalizing, RMS, band pass filter (BPS), smoothing, correlation, and gradient check.

The processor 150 detects the remote control signal generation time point t2 and the sound reception time point t3 using the analysis result. The processor 150 may calculate the total time required by comparing t2 and t3.

In the above, the total time required is measured using the sound reception time t3, but if a length of the sound is known, the total time required may be measured using t4 at which the sound reception is completed without necessarily using the time point t3 at which the sound reception is started.

Meanwhile, in another embodiment of the disclosure as described above, the remote control device 200 may provide only the feedback on the sound reception without transmitting the recorded data. As an example, the remote control device may also transmit time stamp information to the display device 100 through a Bluetooth communication session connected to the display device 100. The time stamp information may be transmitted even at the remote control signal generation time point. The processor 150 may measure the first time point and the second time point by using the time stamp information, and measure the required time using the first and second time points. The remote control device 200 may output the time stamp information when magnitude of the sound received through the microphone 220 is greater than or equal to a predetermined decibel.

Figure 5:
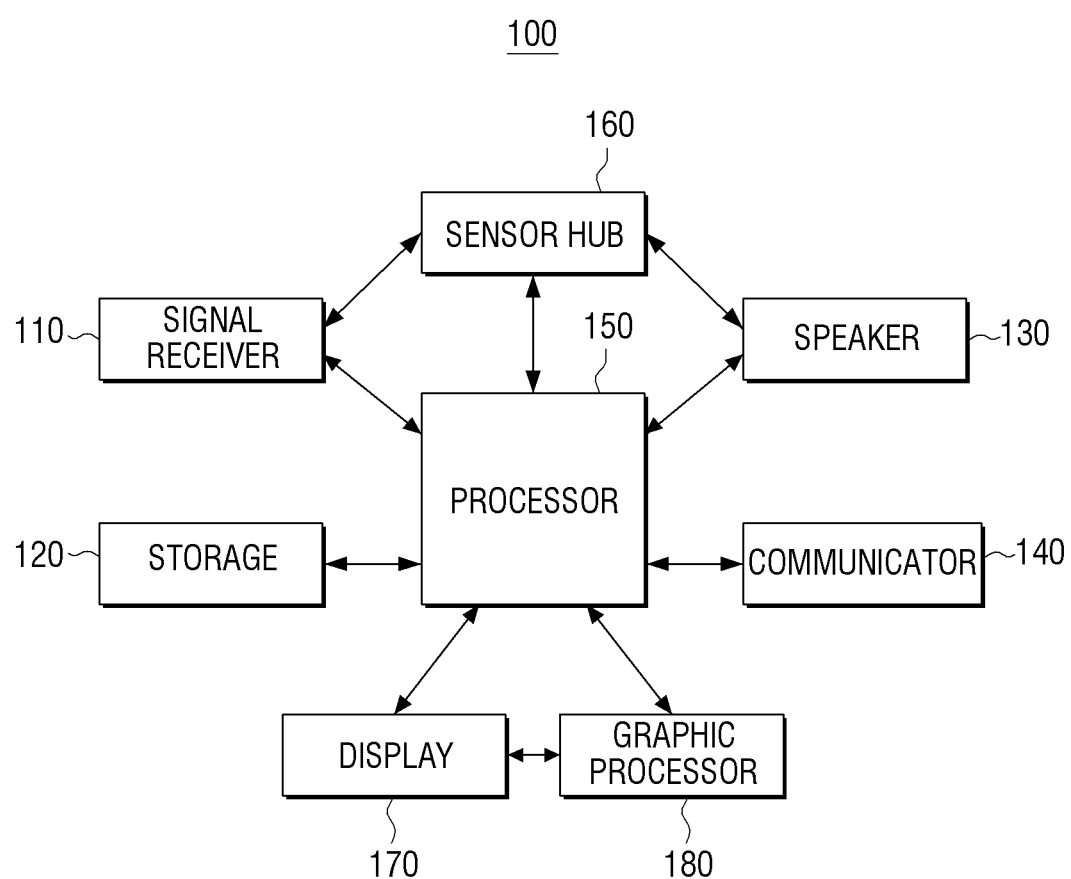
FIG. 5 is a block diagram illustrating an example of a detailed configuration of the display device of FIG. 2.

FIG. 5 is a block diagram illustrating an example of a detailed configuration of the display device of FIG. 2.

Referring to FIG. 5, the display device 100 includes the signal receiver 110, the storage 120, the speaker 130, the communicator 140, the processor 150, a sensor hub 160, a display 170, and a graphic processor 180. A detailed description for the components overlapped with the components illustrated in FIG. 2 among the components illustrated in FIG. 5 will be omitted.

The sensor hub 160 is a component for precisely measuring a remote control signal reception time point and a sound output time point. The sensor hub 160 is connected to the signal receiver 110 through a first pin provided in the signal receiver 110, and is connected to the speaker 130 through a second pin provided in the speaker 130. When the signal receiver 110 receives the remote control signal, the sensor hub 160 checks the fact that the remote control signal is received through the first pin and notifies the processor 150 of the remote control signal reception. In addition, the sensor hub 160 transmits the sound reproduced by the processor 150 to the speaker 130 through the second pin. The sensor hub 160 notifies the processor 150 of a time point at which the sound is transmitted through the second pin. The sensor hub 160 may include an integral filter. The sensor hub 160 may precisely detect the sound output time point by integrating the sound to be output using the integral filter.

The graphic processor 180 is a component for generating various graphic objects such as icons, images, texts, and the like. The graphic processor 180 may generate a UI of the display device 100 under the control of the processor 150.

The display 170 displays various UI screens generated by the graphic processor 180.

When the distance from the remote control device 200 is calculated, the processor 150 may control the graphic processor 180 to change the size, shape, color, font, position, etc. of the UI according to the calculated distance. In addition, if it is determined that the distance from the remote control device is father than a currently set volume size, the processor 150 may also adjust the volume size. The processor 150 may control the graphic processor 180 and the display 170 to generate and output a graphic image of the adjusted volume size.

Figure 6:
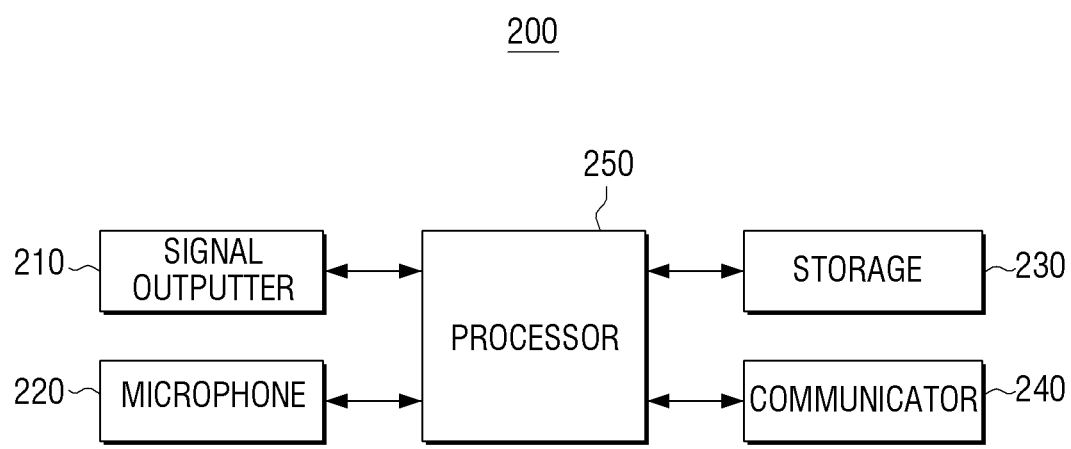
FIG. 6 is a block diagram illustrating a configuration of the remote control device according to an embodiment of the disclosure.

FIG. 6 is a block diagram illustrating a configuration of the remote control device according to an embodiment of the disclosure.

Referring to FIG. 6, the remote control device 200 includes a signal outputter 210, a microphone 220, a storage 230, a communicator 240, and a processor 250.

The signal outputter 210 is a component for outputting various remote control signals. The remote control signal may be an infra-red ray (IR) signal or a radio frequency (RF) signal as described above.

The microphone 220 may record signals and sounds in the storage 230.

The storage 230 may store data stored through the microphone 220.

The communicator 240 communicates with the display device 100 and transmits the stored data to the display apparatus 100 through the communicator 240.

The processor 250 controls an overall operation of the remote control device 200.

When an event for distance measurement occurs, the processor 250 may perform an operation for distance measurement. As an example, when a specific key mapped with the distance measurement command is selected, the processor 250 may activate the microphone 220. The processor 250 may store sound data received through the microphone 220 in the storage 230 and control the signal outputter 210 to send a specific remote control signal. The specific remote control signal refers to a signal including the distance measurement command.

The storage 230 may record various sounds from a recording start time point to a completion time. Specifically, sound generated when the remote control signal is sent, sound output from the display device 100, and the like may be recorded.

The processor 250 ends the recording when a predetermined time elapses after the start of recording. The processor 250 may transmit the recorded data stored in the storage 230 to the display device 100 through the communicator 240.

According to another embodiment, the processor 250 may also transmit time stamp information of each of a remote control signal sending time point and a sound reception time point to the display device 100 without starting the recording.

Meanwhile, in the embodiments described above, the display device 100 has been described as calculating the distance, but the disclosure is not necessarily limited thereto. That is, according to still another embodiment of the disclosure, the remote control device 200 may also directly calculate the distance.

Specifically, the storage 230 may store sound characteristic information. When the recording is completed, the processor 250 analyzes the recorded data to determine whether or not a waveform matching the sound characteristic information exists. If the waveform exists, the processor 250 detects a time point at which the waveform is detected as the second time point. The processor 250 may immediately check the first time point at which the remote control signal is sent without analyzing the recorded data. The processor 250 may calculate a distance from the display device 100 by comparing the first time point and the second time point. The processor 250 may transmit the calculated distance to the display device 100 through the communicator 240. Alternatively, if the remote control device 200 includes a display (not illustrated), the processor 250 may also display the calculated distance on the display.

Meanwhile, the processor 250 of the remote control device 200 may also receive delay time information from the display device 100 for more precise measurement. The processor 250 of the remote control device may calculate only the time required when the sound is transmitted by subtracting the delay time from the total time required, and calculate the distance by multiplying the calculated time by the sound speed.

Figure 7:
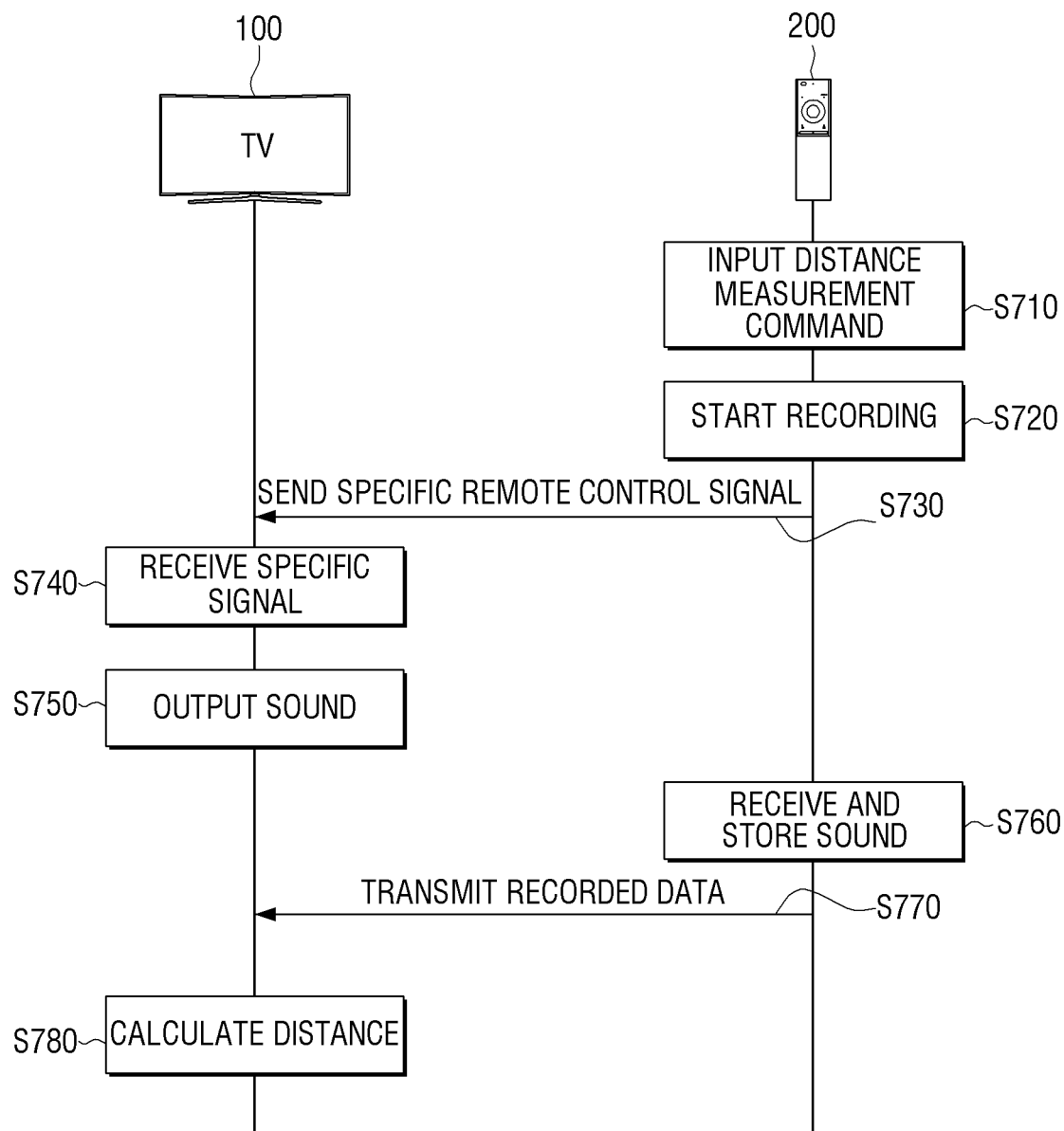
FIG. 7 is a sequence diagram illustrating an operation between the display device and the remote control device according to an embodiment of the disclosure.

FIG. 7 is a sequence diagram illustrating an operation between the display device and the remote control device according to an embodiment of the disclosure.

As illustrated in FIG. 7, when the distance measurement command for measuring the distance is input (S710), the remote control device 200 starts recording (S720) and sends a specific remote control signal (S730). The display device 100 outputs a sound in response to the specific remote control signal (S740 and S750).

The remote control device 200 records and stores the sound received through the microphone 220 and transmits the sound to the display device 100 (S760 and S770). The remote control device 200 calculates the distance using the transmitted recorded data (S780).

A detailed operation of each step has been described above, and thus a detailed description thereof will be omitted.

Figure 8:
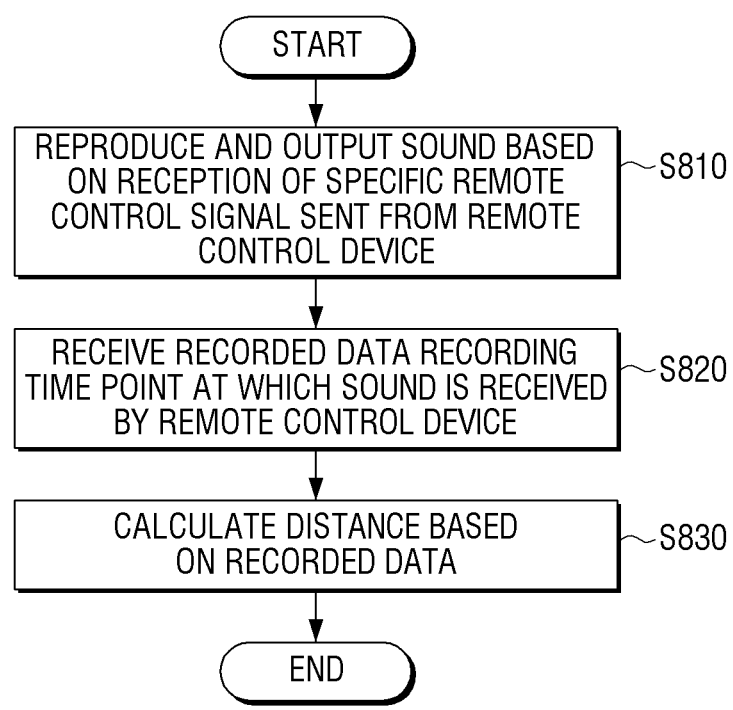
FIG. 8 is a flowchart illustrating a method for calculating a distance of a display device according to an embodiment of the disclosure.

FIG. 8 is a flowchart illustrating a method for calculating a distance of a display device according to an embodiment of the disclosure.

Referring to FIG. 8, when the specific remote control signal sent from the remote control device 200 is received, the display device 100 may reproduce and output the stored sound data (S810). The display device 100 may receive recorded data recording a time point at which the sound is received by the remote control device 200 (S820). The display device 100 may calculate a distance between the display device 100 and the remote control device 200 based on the recorded data (S830).

Specifically, in S830, the display device 100 calculates the total time required by detecting a first time point at which the remote control signal is sent and a second time point at which the sound is received by the remote control device 200, respectively, from the recorded data. The display device 100 may measure the distance from the remote control device 200 by multiplying the calculated time required by the sound speed.

As still another example, for more precise measurement, the display device 100 may calculate a delay time delayed in the display device 100 and then subtract the delay time from the total time required. The display device 100 may also calculate the distance by multiplying the subtraction result by the sound speed.

The display device 100 may detect a first section matching characteristic information of an audio signal generated when the remote control signal is sent and a second section matching characteristic information of the sound from an audio waveform of the recorded data. The starting time point of the first section may be detected as the first time point, and the starting time point of the second section may be detected as the second time point.

Figure 9:
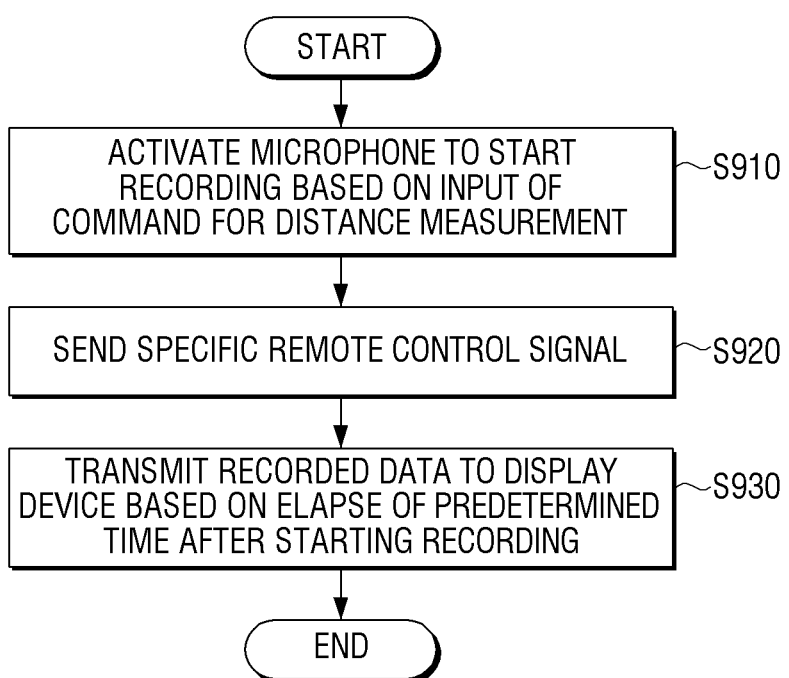
FIG. 9 is a flowchart illustrating a control method of a remote control device according to an embodiment of the disclosure.

FIG. 9 is a flowchart illustrating a control method of a remote control device according to an embodiment of the disclosure.

According to a control method of the remote control device 200 illustrated in FIG. 9, when a distance measurement command for measuring a distance between the display device 100 and the remote control device 200 is input, the remote control device 200 may activate the microphone 220 and record the sound received through the microphone 220 (S910). The remote control device 200 may transmit a specific remote control signal (S920), and may transmit the recorded data to the display device 100 when a predetermined time has elapsed after the start of recording (S930).

The methods for measuring a distance described with reference to FIGS. 7 to 9 may be performed in the display device 100 described with reference to FIGS. 2 to 5 and the remote control device 200 described with reference to FIG. 6, respectively, but are not necessarily limited thereto. That is, the methods for measuring a distance described with reference to FIGS. 7 to 9 may also be performed in devices implemented differently from the devices described above.

Figure 10:
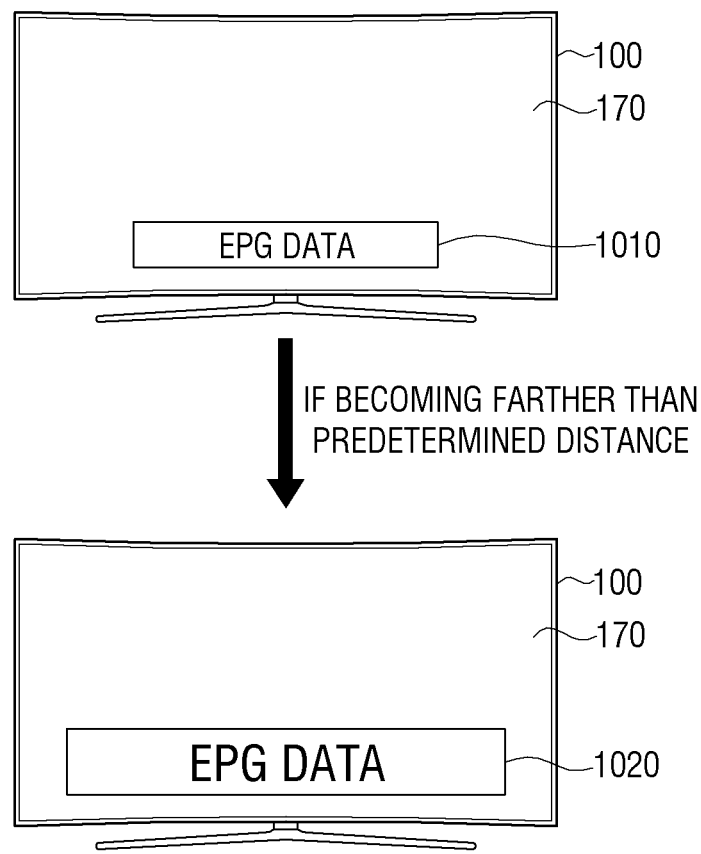
FIGS. 10 and 11 are diagrams illustrating various services provided according to an embodiment of the disclosure.
Figure 11:
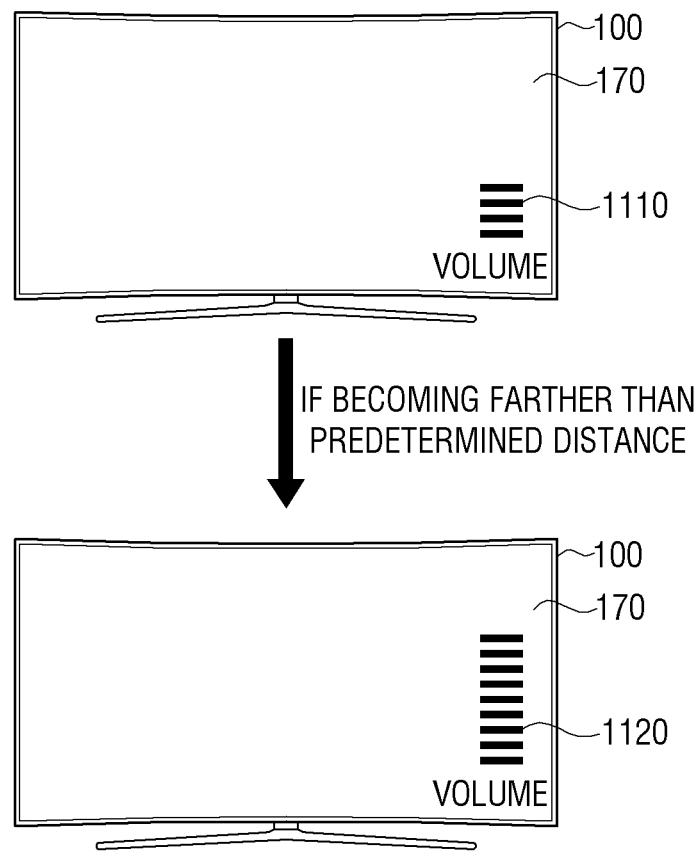

FIGS. 10 and 11 are diagrams illustrating various services provided according to an embodiment of the disclosure.

Referring to FIG. 10, a size of the UI displayed on a display 170 of the display device 100 may be adjusted based on the distance between the display device 100 and the remote control device 200 calculated according to an embodiment of the disclosure.

When the distance between the display device 100 and the remote control device 200 is farther than a predetermined distance, the size of the UI may be enlarged, and when the distance between the display device 100 and the remote control device 200 is closer than the predetermined distance, the size of the UI may be reduced.

For example, according to the method described above, when the distance between the display device 100 and the remote control device 200 is calculated, a size of electronic program guide (EPG) data 1010 may be adjusted based on the calculated distance. When the distance between the display device 100 and the remote control device 200 is farther than the predetermined distance, EPG data 1020 having the enlarged size may be displayed on the display 170.

The predetermined distance may be a distance previously input to the display device 100 or a distance input by the user. The predetermined distance may be set in plural and the size of the UI may be enlarged step by step or gradually when the distance between the display device 100 and the remote control device 200 is farther than each of the predetermined distances. In addition, when the distance between the display device 100 and the remote control device 200 is closer than each of the predetermined distances, the size of the UI may be reduced step by step or gradually.

The UI may be implemented in various forms such as an image, a video, and a text.

Referring to FIG. 11, a volume size 1110 of the display device 100 may be adjusted based on the distance between the display device 100 and the remote control device 200 calculated according to an embodiment of the disclosure. When the distance between the display device 100 and the remote control device 200 is farther than the predetermined distance, an enlarged volume size 1120 may be displayed.

When the distance between the display device 100 and the remote control device 200 is farther than a predetermined distance, the volume size of the display device 100 may be enlarged, and when the distance between the display device 100 and the remote control device 200 is closer than the predetermined distance, the volume size may be reduced.

The predetermined distance may be a distance previously input to the display device 100 or a distance input by the user. The predetermined distance may be set in plural and the volume size may be enlarged step by step when the distance between the display device 100 and the remote control device 200 is farther than each of the predetermined distances. In addition, when the distance between the display device 100 and the remote control device 200 is closer than each of the predetermined distances, the volume size may be reduced step by step.

FIG. 12 is a diagram illustrating experimental result values according to an embodiment of the disclosure.

A distance 1210 indicates an actual distance the display device 100 and the remote control device 200. A result value 1220 indicates the calculated distance between the display device 100 and the remote control device 200 according to an embodiment of the disclosure. A signal sending time point 1230 indicates a sending time point of a specific remote control signal sent from the remote control device 200. A sound output time point 1240 indicates a time point at which the sound is output from the display device 100. A delay time 1250 indicates a time taken from a time point the display device 100 actually receives the specific remote control signal to when outputting a sound.

Referring to FIG. 12, it may be seen that the distance may be precisely measured without adding a separate component such as an ultrasonic sensor, a laser sensor, or a camera to the remote control device 200 or the display device 100.

According to diverse embodiments of the disclosure as described above, the distance between the devices may be calculated and used in various ways using the display device 100 capable of outputting the sound and the remote control device 200 capable of receiving the sound.

In the above description, the speaker 130 is included in the display device, but the embodiments described above are also applicable to a case in which the speaker 130 is spaced apart from the display device 100. However, in this case, a distance between the speaker 130 and the remote control device 200 is calculated. The calculated distance may be used for volume level adjustment and the like.

In addition, in the above description, although the diverse embodiments of measuring the distance between the remote control device 200 and the display device 100 have been described, the location of the remote control device 200 may be determined by outputting sound of a plurality of different characteristics through a plurality of speakers. For example, if the display device 100 is connected to a plurality of external speakers and location information of each speaker is known, the display device 100 may separately output sounds having different frequency characteristics through each speaker when the specific remote control signal is received. These sounds are recorded by the remote control device, and the recorded data is transmitted to the display device. The display device analyzes the recorded data in the manner described above to detect a reception time point of each sound. Accordingly, a distance between each speaker and the remote control device may be calculated. In the case of using three or more speakers, the display device may detect the location of the remote control device by comprehensively considering the distance calculated from the location of each speaker.

In addition, in the above description, although the display device has been described as calculating the distance from the remote control device, the method for calculating the distance according to the diverse embodiments described above may be implemented in a display device without a display. For example, devices such as a set-top box, an audio player, a home network server, and the like connected to a display device or a speaker may also calculate a distance from the remote control device. When the remote control signal is received from the remote control device, the set-top box may control to reproduce sound data stored in the set-top box and output the sound data through an external speaker, or transmit and output a control signal for reproducing sound data stored in an external device to the external device.

Meanwhile, the diverse embodiments described above may be implemented in a computer or similar device readable recording medium using software, hardware, or a combination thereof. In some cases, the embodiments described in the disclosure may be implemented by the processor itself. According to a software implementation, the embodiments such as procedures and functions described in the disclosure may be implemented as separate software modules. Each of the software modules may perform one or more functions and operations described in the disclosure.

Meanwhile, computer instructions for performing processing operations according to the diverse embodiments of the disclosure described above may be stored in a non-transitory computer-readable medium. The computer instructions stored in the non-transitory computer-readable medium allow a specific device to perform the processing operations according to the diverse embodiments described above when being executed by a processor.

The non-transitory computer-readable medium refers to a medium that stores data semi-permanently and is read by a device, not a medium storing data for a short time such as a register, a cache, a memory, and the like. A specific example of the non-transitory computer-readable medium may include a compact disk (CD), a digital versatile disk (DVD), a hard disk, a Blu-ray disk, a universal serial bus (USB), a memory card, a read only memory (ROM), or the like.

Although the embodiments of the disclosure are illustrated and described hereinabove, the disclosure is not limited to the abovementioned specific embodiments, but may be variously modified by those skilled in the art to which the disclosure pertains without departing from the scope and spirit of the disclosure claimed in the claims. These modifications should also be understood to fall within the scope of the disclosure.

What is claimed is:

1. A display device comprising:
    a signal receiver;
    communication circuitry;
    a storage storing sound data;
    a speaker; and
    a processor configured to:
        based on a specific remote control signal transmitted from a remote control device being received through the signal receiver, provide a sound based on the sound data stored in the storage through the speaker,
        receive first time information corresponding to a first time when the remote control device transmit the specific remote control signal and second time information corresponding to a second time when a sound received by the remote control device is equal to or greater than a predetermined value through the communication circuitry, and
        obtain a distance between the display device and the remote control device based on the first time information and the second time information.

2. The display device as claimed in claim 1, wherein the processor is configured to obtain a delay time required by the display device to provide the sound through the speaker after receiving the specific remote control signal, and multiplying a speed of sound by a subtraction result value obtained by subtracting the delay time from a total time between the first time and the second time.

3. The display device as claimed in claim 2, further comprising a sensor hub configured for connection to the signal receiver through a first pin provided in the signal receiver and for connection to the speaker through a second pin provided in the speaker,
    wherein the processor is configured to obtain, as the delay time, a time difference between a time point at which the specific remote control signal is transmitted to the sensor hub through the first pin and a time point at which the sound is transmitted from the sensor hub to the speaker through the second pin.

4. The display device as claimed in claim 3, wherein the storage is configured to store characteristic information of an audio signal generated based on a transmitting of the specific remote control signal and characteristic information of the sound, respectively, and
    the processor is configured to obtain the first time and the second time, based on the characteristic information of the audio signal and the characteristic information of the sound.

5. The display device as claimed in claim 1, further comprising a display,
    wherein the processor is configured to, for a user interface (UI) displayed on the display, enlarge a size of the UI based on the obtained distance being greater than a predetermined distance, and reduce a size of the UI based on the obtained distance being less than the predetermined distance.

6. The display device as claimed in claim 1, wherein the processor is configured to obtain a volume size of the display device based on the obtained distance.

7. The display device as claimed in claim 1, wherein the signal receiver comprises at least one of an infra-red ray (IR) signal receiver or a radio frequency (RF) signal receiver, and the communication circuitry comprises at least one of a Bluetooth, Wi-Fi, Wi-Fi Direct, or Zigbee communication circuitry.

8. A display system comprising:
a display device; and
a remote control device configured to control the display device,
wherein the remote control device comprises a processor configured to activate a microphone to start recording sound based on an occurrence of an event for a distance measurement of a distance between the remote control device and the display device, and control to transmit a specific remote control signal to the display device,
wherein the display device comprises a processor configured to control to provide sound corresponding to pre-stored sound data based on receiving the specific remote control signal from the remote control device,
wherein the processor of the remote control device is configured to control to transmit sound data based on the recorded sound to the display device based on an elapsed predetermined time from the starting of the recording, and
the processor of the display device is configured to obtain a distance between the display device and the remote control device based on the sound data transmitted by the remote control device.

9. The display system as claimed in claim 8, wherein the processor of the display device is configured to obtain the distance by detecting, using the sound data transmitted by the remote control device, a first time at which the specific remote control signal is transmitted and a second time at which the sound provided by the display device is received at the remote control device, respectively, obtaining a delay time required by the display device to provide the sound after receiving the specific remote control signal, and multiplying a speed of sound by a subtraction result value obtained by subtracting the delay time from a total time between the first time and the second time.

10. The display system as claimed in claim 8, wherein the display device includes:
a signal receiver configured to receive the specific remote control signal;
communication circuitry configured to receive the sound data from the remote control device;
a storage configured to store the prestored sound data;
a speaker configured to provide sound; and
a sensor hub configured for connection to the signal receiver through a first pin provided in the signal receiver and for connection to the speaker through a second pin provided in the speaker, and wherein the processor is configured to obtain the distance by detecting, using the sound data transmitted by the remote control device, a first time at which the specific remote control signal is sent and a second time at which the sound provided by the display device is received at the remote control device, respectively, obtaining a delay time by subtracting a time at which the sound is transmitted to the speaker through the second pin from the sensor hub from a time at which the specific remote control signal is transmitted to the sensor hub through the first pin, and multiplying a speed of sound by a subtraction result value obtained by subtracting the delay time from a total time between the first time and the second time.

11. A method for calculating a distance of a display device, the method comprising:
receiving a specific remote control signal transmitted from a remote control device;
based on receiving the specific remote control signal, providing sound through a speaker based on pre-stored first sound data;
receiving from the remote control device, second sound data for sound recorded by the remote control device based on transmitting the specific remote control; and
obtaining a distance between the display device and the remote control device based on the second sound data.

12. The method as claimed in claim 11, wherein the obtaining of the distance includes:
detecting, using the second sound data, a first time at which the specific remote control signal is transmitted and a second time at which the sound provided through the speaker is received at the remote control device, respectively;
obtaining a delay time required by the delay device to provide the sound through the speaker after receiving the specific remote control signal; and
obtaining the distance by multiplying a sound speed by a subtraction result value obtained by subtracting the delay time from a total time between the first time and the second time.

13. The method as claimed in claim 12, wherein the calculating of the total time includes:
detecting a first section matching characteristic information of an audio signal generated based on a transmitting of the specific remote control signal and a second section matching characteristic information of the sound, from an audio waveform of the second sound data; and
detecting a start time of the first section as the first time and detecting a start time of the second section as the second time.

14. The method as claimed in claim 11, further comprising, for a user interface (UI) displayed on a display, enlarging a size of the UI based on the obtained distance being greater than a predetermined distance, and reducing the size of the UI based on the obtained distance being less than the predetermined distance.

15. The method as claimed in claim 11, further comprising obtaining a volume size of the display device based on the obtained distance.

* * * * *